Patented Aug. 7, 1951

2,563,739

UNITED STATES PATENT OFFICE 2,563,739

SOLVENT EXTRACTION OF ORGANIC ACIDS

John William Palm and Jack A. King, Pawhuska, Okla., assignors to Cities Service Oil Company, Bartlesville, Okla., a corporation of Delaware No Drawing. Application September 4, 1948, Serial No. 47,952

6 Claims. (Cl. 260—450)

This invention relates to the recovery of organic acids from dilute aqueous solution, and more particularly to the recovery of such acids by solvent extraction.

In the Fischer-Tropsch process and modifications thereof, an aqueous fraction is obtained which generally contains oxygenated chemicals resulting from the interaction of carbon oxides and hydrogen, these organic chemicals comprising lower alcohols, carbonyls, acetals, esters, and acids. The lower boiling alcohols, acetals, esters, and other carbonyl materials may be removed from this aqueous solution by fractional distillation, leaving as a bottoms product an aqueous solution of acidic materials, which generally contains no more than 3 to 6 per cent of acids. While the percentage of acids in the solution is not large, the large volumes of aqueous products produced in a plant employing a modified Fischer-Tropsch reaction contain a sufficiently large tonnage of acids to make their recovery essential if the full economic value of the process is to be realized. In practice, the art has found it to be extremely difficult to separate these acids from the water by fractional distillation, since the various acids form azeotropes with the water, as a consequence of which the overhead product from fractional distillation will contain considerable quantities of water.

It is an object of our invention to recover by solvent means substantially all of the acids contained in weak aqueous solutions of organic acids while limiting the loss of solvent in the raffinate.

It is a further object of this invention to recover substantially anhydrous organic acids from the extract.

Other and further objects of our invention will become apparent as the disclosure proceeds.

Generally speaking, we have found that solvents having good extractive powers are soluble to a considerable extent in water, while solvents substantially insoluble in water have low extractive powers. Thus methyl ethyl ketone, while an excellent extractive agent, is too soluble in water to permit its use in commercial practice. We have discovered, however, that by using a mixed solvent, it is possible to extract from a weak aqueous solution of lower organic acids substantially all of the acid content while limiting loss of solvent in the aqueous solution to a very low amount, thereby decreasing the expense of recovering the dissolved solvent from the aqueous solution. We have found that a mixture of methyl ethyl ketone and isopropyl ether makes an excellent extracting agent for the removal of organic acids from a weak solution thereof if used in proportions of 50 to 90 per cent of methyl ethyl ketone to 50 to 10 per cent of isopropyl ether. When these solvents are mixed and introduced to the extraction column as much as 95 per cent of the acids present may be removed from the aqueous solution with a loss of only about 15 per cent of the methyl ethyl ketone and 1 per cent of the isopropyl ether in the raffinate, as compared to a loss of up to 35 per cent if the methyl ethyl ketone were to be used alone.

We have further found that if the solvents are introduced separately into the extraction column, the methyl ethyl ketone being introduced above the isopropyl ether, the isopropyl ether in passing upwards through the extraction column will extract a large percentage of the methyl ethyl ketone from the stripped aqueous solution, and that the percentage of acids extracted by this procedure is substantially the same as when the solvents are introduced in a mixed state. By this means we have been able to reduce the amount of methyl ethyl ketone and isopropyl ether lost in the raffinate to as low as about 2 per cent of ketone and 1 per cent of isopropyl ether, thus reducing the heat requirements for the recovery of the solvents.

The acids extracted by the solvents may easily be recovered by fractionating the solvents from the acids, and, when the mixed solvent contains not less than about 20 per cent isopropyl ether, the solvent and the water in the extract will form an azeotrope such that substantially dehydrated acids may be recovered as a bottoms product from the distillation.

Our mixed solvent is free from hydrolysis difficulties such as are encountered when using an ester solvent, and has a considerably lower density than ethyl acetate, thus permitting the use of a substantially smaller extraction tower for processing a given quantity of weak acid solution at the same solvent ratio as used with ethyl acetate.

In order that those skilled in the art may more fully appreciate our invention and the method of carrying it out, the following examples are given. In all the examples, we used an extraction column consisting of an 18 mm. glass tube 47 inches long packed with ¼-inch Berl saddles. This column was provided with three inlets, the first 3 inches from the top for the acid feed, the second 1 inch from the bottom for the isopropyl ether or the mixed ether and methyl ethyl ketone solvent and the third 17 inches from the bottom for the introduction of the ketone separately from the ether. Two outlets, one near the top for extract recovery, and one at the bottom for raffinate recovery, were also provided. Three 1,000 ml. burettes suspended above the extraction column were used for the acid and solvent feeds and rotameters were used to hold the rate constant. One hour was allowed for the column to come to an equilibrium after which hourly samples were taken, calculations being made on the average of all samples. The extracts and raffinates were weighed and analyzed for acids by neutralization, ketones by hydroxyl amine, and water by the Karl Fischer method. The ether content of the extract and raffinate was measured by difference.

*Example 1*

A 5 per cent solution of acetic acid in water was introduced into the top of the extraction column, and a mixture of 50 per cent isopropyl ether and 50 per cent methyl ethyl ketone was introduced into the extraction column through the lowest inlet in a ratio of 2.1 volumes of solvent to each volume of acid-containing stock. It was found that 90.4 per cent of the acid was extracted in this process, and that 14.5 per cent of the ketone was lost in the raffinate.

*Example 2*

A 5 per cent solution of acetic acid in water was introduced to the top of the extraction column, and a mixed solvent was introduced to the column through the lowest inlet, the proportion of methyl ethyl ketone to isopropyl ether being 3:1, with a solvent feed ratio of 2.2:1. It was found that 96.5 per cent of the acid was extracted from the weak aqueous solution of acetic acid and that 13.5 per cent of the ketone used was lost in the raffinate.

*Example 3*

This run was carried out under the conditions of Example 2 except that the solvent consisted of 87.5 per cent methyl ethyl ketone and 12.5 per cent of isopropyl ether. It was found that, with a solvent to feed ratio of 2.1:1, 97 per cent of the acid was extracted from the weak aqueous acid solution, with a loss of 15.6 per cent of the ketone in the raffinate.

*Example 4*

The same 5 per cent acetic acid solution was used as was used in the preceding example. However, the isopropyl ether was introduced into the extraction column through the bottom inlet, and the methyl ethyl ketone was introduced into the extraction column separately through the inlet 17 inches above the bottom of the extraction column. The proportion of ketone to ether used was 52:48, and a solvent-feed ratio of 2:1 was employed. Under these operating conditions, it was found that 88.4 per cent of the acid was extracted from the weak acid solution, with a loss of only 4.4 per cent of the ketone in the raffinate.

*Example 5*

The acid solution of the preceding examples was fed to the extraction column, and the ether and ketone were introduced separately into the extraction column, in the proportion of 77 parts of ketone to 23 parts of ether, a 2.1:1 ratio of solvent to feed being used. It was found that 95.2 per cent of the acid was extracted from the weak acid solution, with a loss of only 2.6 per cent of the ketone in the raffinate.

*Example 6*

The procedure of the preceding example was followed except that the ratio of ketone to ether was 87.5 per cent to 12.5 per cent and a 3:1 ratio of solvent to feed was used. It was found that 96.5 per cent of the acid was extracted from the weak solution with a loss of only 1.9 per cent of the ketone in the raffinate.

*Example 7*

In this run a mixture of ketone and ether in the proportion of 73 per cent methyl ethyl ketone and 27 per cent isopropyl ether was admitted to the extraction column through the lowest inlet. The acid feed stock in this case consisted of the water layer from a modified Fischer-Tropsch synthesis from which the low boiling alcohols and carbonyls had been stripped. This aqueous fraction contained 3.01 per cent by weight of acids of the range of acetic, propionic, and butyric acids and approximately 97 per cent by weight of water. The solvent to feed ratio was held at 2:1. It was found that 95 per cent of the acid was extracted from the aqueous solution, with a loss of 14.8 per cent of the ketone used in the raffinate.

*Example 8*

The same stripped Fischer-Tropsch water layer was used as the feed stock as in the preceding example. The ketone was introduced into the column above the ether, in the ratio of 75 parts of ketone to 25 parts of ether, a solvent to feed ratio of 2:1 being maintained. It was found that 94.9 per cent of the acid present in the stripped Fischer-Tropsch water was removed by the solvent with a loss of only 3.4 per cent of the ketone in the raffinate.

It will be apparent from the foregoing that by using a mixed solvent comprising methyl ethyl ketone and isopropyl ether for the extraction of lower organic acids from weak aqueous solution, 95 per cent and over of the acid present in the weak aqueous solution may be removed, with less solvent loss than if methyl ethyl ketone alone were to be used, and by introducing the ether to the extraction column at a point lower than that used for the introduction of the ketone, that only a minor loss of solvent in the raffinate occurs. Furthermore, by using a solvent containing at least 20 per cent of isopropyl ether, a substantially anhydrous acid product may be obtained upon distillation of the solvent from the acids.

Having now described our invention, what we claim is:

1. The method of recovering organic acids from aqueous solutions including introducing an aqueous solution of lower aliphatic acids derived from a Fischer-Tropsch synthesis containing less than about five per cent acids to the top of an extraction tower, introducing isopropyl ether to the bottom of the extraction tower, introducing methyl ethyl ketone to the extraction tower at a point above the introduction point of the isopropyl ether, passing the aqueous solution through the extraction tower in countercurrent to the isopropyl ether and methyl ethyl ketone, recovering an extract containing aliphatic acids from the top of the extraction column and recovering an aqueous solution of aliphatic acids substantially weaker than the original aliphatic acid solution from the bottom of the tower.

2. The method of claim 1 in which the methyl ethyl ketone and the isopropyl ether are introduced into the column in the ratio of from about one part to about nine parts of methyl ethyl ketone to one part of isopropyl ether by volume.

3. The method of claim 1 in which the methyl ethyl ketone and the isopropyl ether are introduced into the column in the ratio of about three parts of methyl ethyl ketone to one part of isopropyl ether by volume.

4. The method of recovering organic acids from aqueous solutions including continuously introducing an aqueous solution of lower aliphatic acids derived from a Fischer-Tropsch synthesis containing less than about five per cent acids to the top of an extraction tower, continuously introducing isopropyl ether to the bottom of the extraction tower, continuously introducing methyl ethyl ketone to the extraction tower at a point above the point of introduction of the isopropyl ether, the methyl ethyl ketone and isopropyl ether being introduced into the column in the ratio of from about one part to about four parts of methyl ethyl ketone to one part of isopropyl ether by volume, passing the aqueous solution through the extraction tower in countercurrent to the isopropyl ether and methyl ethyl ketone, continuously recovering from the bottom of the extraction tower an aqueous solution of aliphatic acids substantially weaker than the aliphatic acid solution fed to the top of the extraction tower, continuously recovering an extract containing aliphatic acids from the top of the extraction column, subjecting the extract to fractional distillation, recovering as overhead products methyl ethyl ketone, isopropyl ether and water, and recovering as a bottoms product substantially anhydrous aliphatic acids.

5. The method of claim 4 in which the methyl ethyl ketone and isopropyl ether are introduced in the ratio of about three parts of methyl ethyl ketone to one part of isopropyl ether by volume.

6. The method of claim 4 in which the acid content of the aqueous acid feed stock is from about 2 per cent to about 6 per cent by weight, and the ratio of solvent feed to aqueous acid feed is from about 2:1 to about 3:1.

JOHN WILLIAM PALM.
JACK A. KING

REFERENCES CITED

The following references are of record in the file of this patent:

UNITED STATES PATENTS

| Number | Name | Date |
|---|---|---|
| 1,958,898 | Lunt | May 15, 1934 |
| 2,033,978 | Dreyfus | Mar. 17, 1936 |
| 2,165,438 | Allquist | July 11, 1939 |
| 2,516,940 | Arnold et al. | Aug. 1, 1950 |